United States Patent [19]

Ihara et al.

[11] Patent Number: 5,963,110
[45] Date of Patent: Oct. 5, 1999

[54] EQUALIZING FILTER AND CONTROL METHOD FOR SIGNAL EQUALIZATION

[75] Inventors: Takeshi Ihara; Hiroshi Hamano, both of Kawasaki, Japan

[73] Assignee: Fujitsu Limited, Kawasaki, Japan

[21] Appl. No.: 09/033,238

[22] Filed: Mar. 3, 1998

[30] Foreign Application Priority Data

Oct. 16, 1997 [JP] Japan ..................................... 9-283814

[51] Int. Cl.⁶ ..................................................... H03H 7/03
[52] U.S. Cl. ..................... 333/28 R; 333/81 R; 333/167
[58] Field of Search .............. 333/18, 20, 28 R, 333/81 R; 330/304, 306; 375/229; 381/98, 103

[56] References Cited

U.S. PATENT DOCUMENTS 2,717,956   9/1955   Eglin ................................. 333/28 R X
4,490,692   12/1984  Schorr .................................. 333/28 R
4,967,169   10/1990  Sun et al. ............................. 333/28 R

*Primary Examiner*—Paul Gensler
*Attorney, Agent, or Firm*—Staas & Halsey, LLP

[57] ABSTRACT

An equalizing filter with an optimized frequency response and improved reliability and quality, for equalizing a reception signal so as to regain its original waveform. The equalizing filter comprises a low-pass filter and a high-frequency booster circuit. With its limited passband, the low-pass filter rejects the noise components contained in the signal being processed. The high-frequency booster circuit has such a frequency response that exhibits a stepwise gain increase at high frequencies. Those two elements, composed of reliable passive components, are coupled in series to provide a combined frequency response that is optimized for the design of highly sensitive optical receivers. As integral part of the high-frequency booster circuit, the equalizing filter employs an inductor made of a bonding wire. To obtain a predetermined inductance with high accuracy, the bonding wire is divided into a plurality of sections, which are used to make a daisy chain connection that bridges between a plurality of lands disposed on the substrate.

9 Claims, 21 Drawing Sheets

FIG. 19(A) 30、31 RESISTIVE ATTENUATOR

| R20、R30 | 2.85Ω |
|---|---|
| R21、R31 | 2.85Ω |
| R22、R32 | 433Ω |

FIG. 19(B) 10 LOW-PASS FILTER

| L10 | 154pH |
|---|---|
| L11 | 711pH |
| L12 | 1.0nH |
| C10 | 179fF |
| C11 | 393fF |

FIG. 19(C) 22 HIGH-FREQUENCY BOOSTER CIRCUIT

| C10 | 4pF |
|---|---|
| R4 | 11.6Ω |
| R5 | 436Ω |
| R6 | 436Ω |
| L3 | 10nH |

EQUALIZING FILTER AND CONTROL METHOD FOR SIGNAL EQUALIZATION

BACKGROUND OF THE INVENTION

1. Field of the Invention

The present invention relates to an equalizing filter, a control method for signal equalization, and a method of forming an inductor. Particularly, the present invention relates to an equalizing filter for equalizing an electrical reception signal to reshape its waveform, a control method for obtaining a signal equalized in the frequency domain so that it will exhibit better eye patterns, and a method of forming an inductor on a substrate.

2. Description of the Related Art

In the recent trend toward the "Information Age" society, there is a strong demand for highly efficient data communications networks capable of handling a variety of data in a large volume. The broadband ISDN (B-ISDN) have been studied and introduced aggressively as a core technology for such network infrastructures. Another important aspect of data communication is the cost of services. Economical and reliable optical networks are indispensable for low-cost communication services. As such, the optical communication technology plays a key role in realizing B-ISDN infrastructures, and to this end, the design of optical receivers is of particular importance in its actual implementation since a higher sensitivity promises a longer transmission distance.

FIG. 21 is a block diagram of a typical optical receiver 200 available today. This optical receiver 200 comprises: a photodetector PD to transduce the entered optical beam into an electrical signal, a preamplifier 201 to amplify the electrical signal, an equalizing filter 202 to shape the signal waveform by equalizing the frequency components contained therein, and a discrimination circuit 203 to detect the symbols for binary 1s and 0s.

In operation of the optical receiver 200, a given optical input signal is first converted into an electrical signal by the photodetector PD. Besides containing some undesired noise, this electrical signal is distorted due to the non-ideal characteristics of fiber optic transmission media. After being amplified by the preamplifier 201, the electrical signal with such distortion and noise is subjected to the equalizing filter 202, which is carefully designed to yield maximum signal-to-noise (S/N) ratios. The equalizing filter 202 reshapes the signal waveform and filters out the noise with its limited passband. After that, the discrimination circuit 203 determines the signal levels and produces logical 1s and 0s as its data outputs.

To maximize the sensitivity of the optical receiver 200 configured as above, it is necessary to optimize the frequency response so that the receiver will exhibit a wider aperture in so-called "eye pattern" tests. The eye pattern is a method for evaluating a data transmission system by using an oscilloscope to display received data bits in synchronization with the original transmission clock signal being used. The ideal rectangular edge between the "1" and "0" states appears rounded due to unwanted jitters and phase distortion, thus forming an eye-shaped pattern. Here, wider eye opening generally indicates better signal quality. To obtain a wider eye aperture in such tests, the above-described equalizing filter must have an adequate peaking characteristic in its frequency response, as well as an appropriate order of its roll-off characteristics.

Conventional equalizing filters, however, cannot provide stable operations at transmission rates as high as several gigabits per second. This is because the conventional filters contain some active components, such as transistors, which have little performance margins in that high frequency range. In addition, the frequency response of conventional equalizing filters can easily be affected by the variations in active components' device parameters, temperature changes, and fluctuations in supply voltages. Such factors cause adverse effect on the reliability and quality of those optical receiver products.

SUMMARY OF THE INVENTION

Taking the above into consideration, a first object of the present invention is to provide an equalizing filter with an optimized frequency response and improved reliability and quality.

A second object of the present invention is to provide a control method for signal equalization so that the optical receiver will exhibit a wider aperture in eye pattern tests.

A third object of the present invention is to provide a method of forming an inductor with excellent high-frequency characteristics.

To accomplish the first object, according to the present invention, there is provided an equalizing filter for equalizing a signal to obtain a desired waveform thereof. This equalizing filter comprises: a low-pass filter composed of passive components; and a high-frequency booster circuit, coupled to the low-pass filter and composed of passive components, whose frequency response exhibits a stepwise gain increase at high frequencies.

To accomplish the second object, according to the present invention, there is provided a control method for signal equalization to obtain a frequency response that exhibits a wider aperture in an eye pattern test. This control method comprises the steps of: making a series connection of a low-pass filter and a high-frequency booster circuit having a stepwise gain increase in a high frequency range; and producing a combined frequency response having a peak at a predetermined frequency.

To accomplish the third object, according to the present invention, there is provided a method of forming an inductor on a substrate. This method comprises the steps of: dividing a bonding wire into a plurality of sections; and making a daisy chain connection that bridges between a plurality of lands disposed on the substrate with the plurality of sections of the bonding wire, thereby forming the inductor.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 19(A) is a table which shows the values of passive components used in resistive attenuators;

FIG. 19(B) is a table which shows the values of passive components used in a low-pass filter;

FIG. 19(C) is a table which shows the values of passive components used in a high-frequency booster circuit;

DESCRIPTION OF THE PREFERRED EMBODIMENTS

An embodiment of the present invention will be described below with reference to the accompanying drawings.

Figure 1:
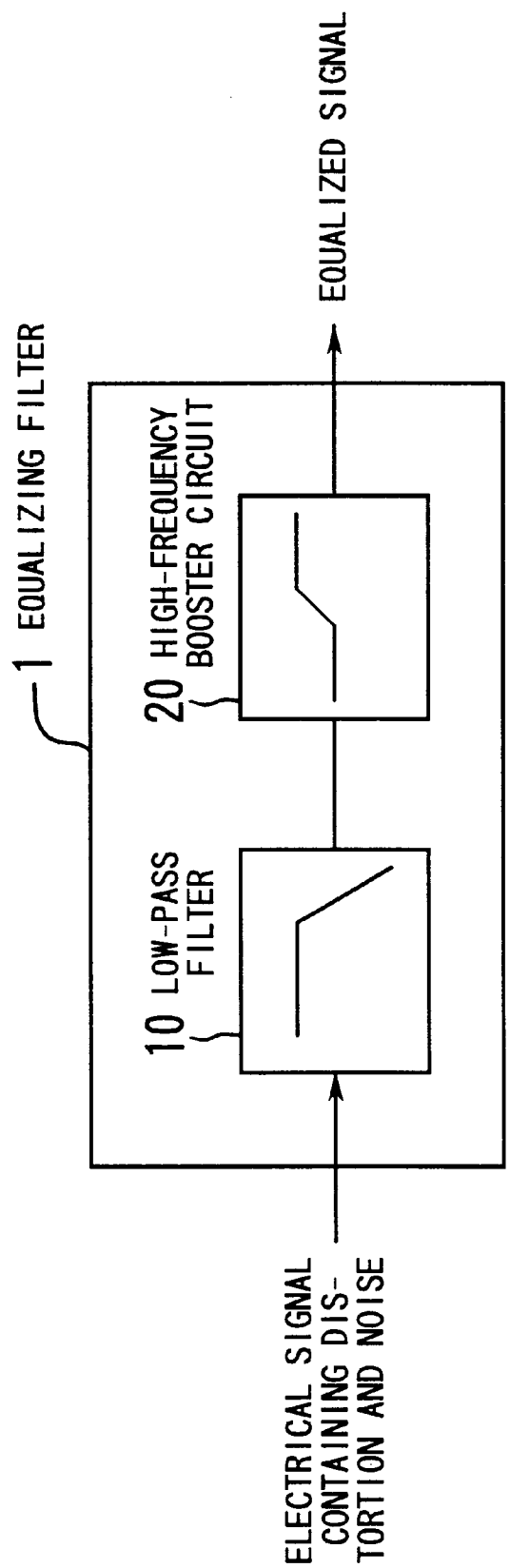
FIG. 1 is a conceptual view of an equalizing filter of the present invention.

FIG. 1 is a conceptual view of an equalizing filter 1 proposed in the present invention. This equalizing filter 1 comprises a low-pass filter 10 and a high-frequency booster circuit 20 that enhances the high-frequency gain in a stepwise manner. Those two elements are connected in series, thus providing a combined frequency response of the equalizing filter 1 as a whole. With this structural arrangement, the equalizing filter 1 exhibits a frequency response with an appropriate peaking characteristic, allowing the received electrical signal to be subjected to optimal waveform shaping and bandwidth limitation to compensate for distortion and to reject noise.

Figure 2:
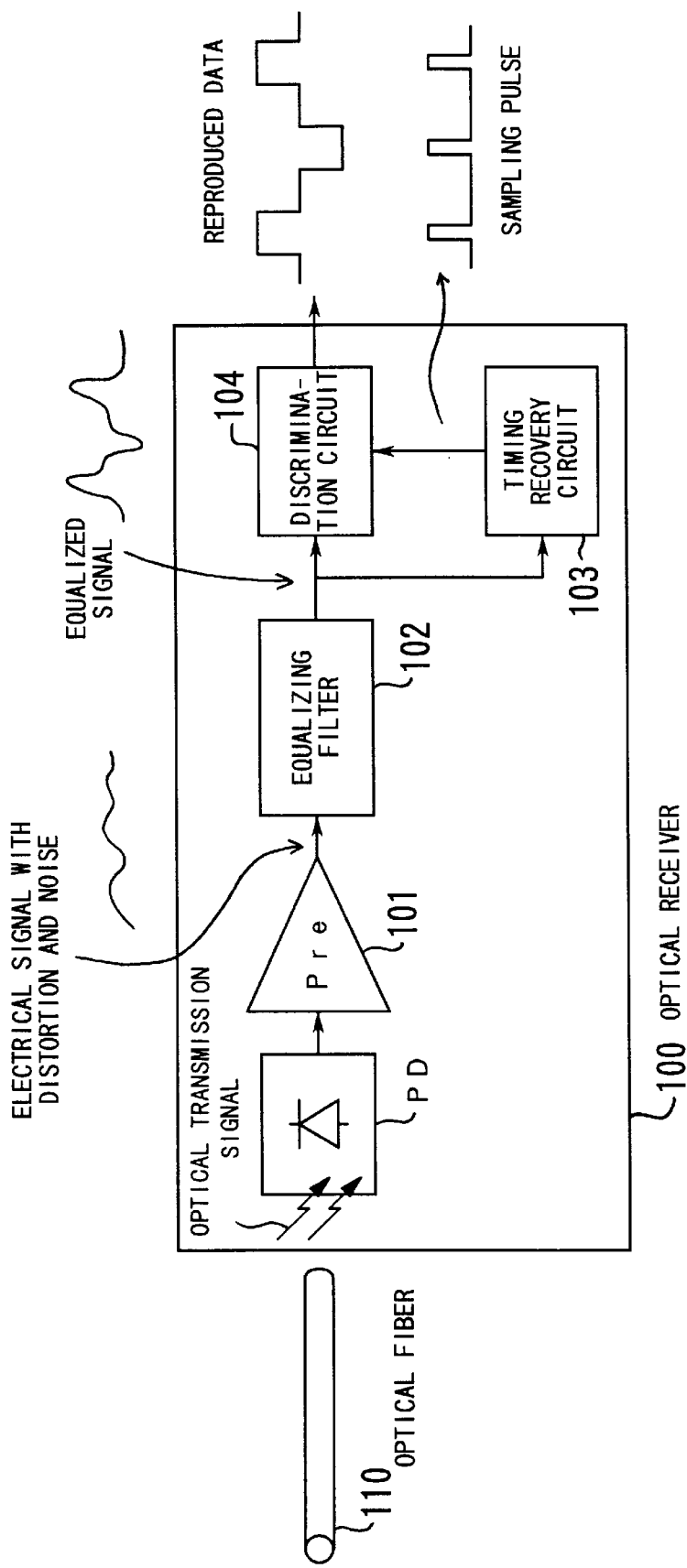
FIG. 2 is a conceptual view which shows how an electrical signal is processed in an optical receiver of the present invention.

The following few paragraphs clarify how the electrical signal is equalized in the optical receiver. FIG. 2 schematically shows an optical receiver 100 according to the present invention. This optical receiver 100 receives an optical transmission signal through an optical fiber 110 coupled thereto. A photodetector PD transduces the received optical signal into an electrical signal. Since the optical signal strength has been reduced during the propagation through the optical fiber 110, the optical receiver 100 employs a preamplifier 101 to regain the amplitude before subjecting the signal to the next stage.

The amplified electrical signal is then equalized by an equalizing filter 102. A timing recovery circuit 103 extracts sampling pulses from the equalized electrical signal and supplies them to a discrimination circuit 104. Based on those sampling pulses, the discrimination circuit 104 digitizes the equalized signal by discriminating between 1s and 0s, thereby reproducing the original pulse train.

As described above, the optical transmission signal suffers from attenuation and distortion during the travel over the optical fiber 110 before reaching the optical receiver 100. Such optical signal is then converted into an electrical signal and amplified, which process, however, introduces some noise originating in bias circuits (not shown) that supply voltages to the photodetector PD and preamplifier 101. It is therefore necessary to compensate for the distortion and filter out the noise from such a deformed transmission signal. To this end, the frequency response of the equalizing filter 102 should be carefully designed.

Figure 3:
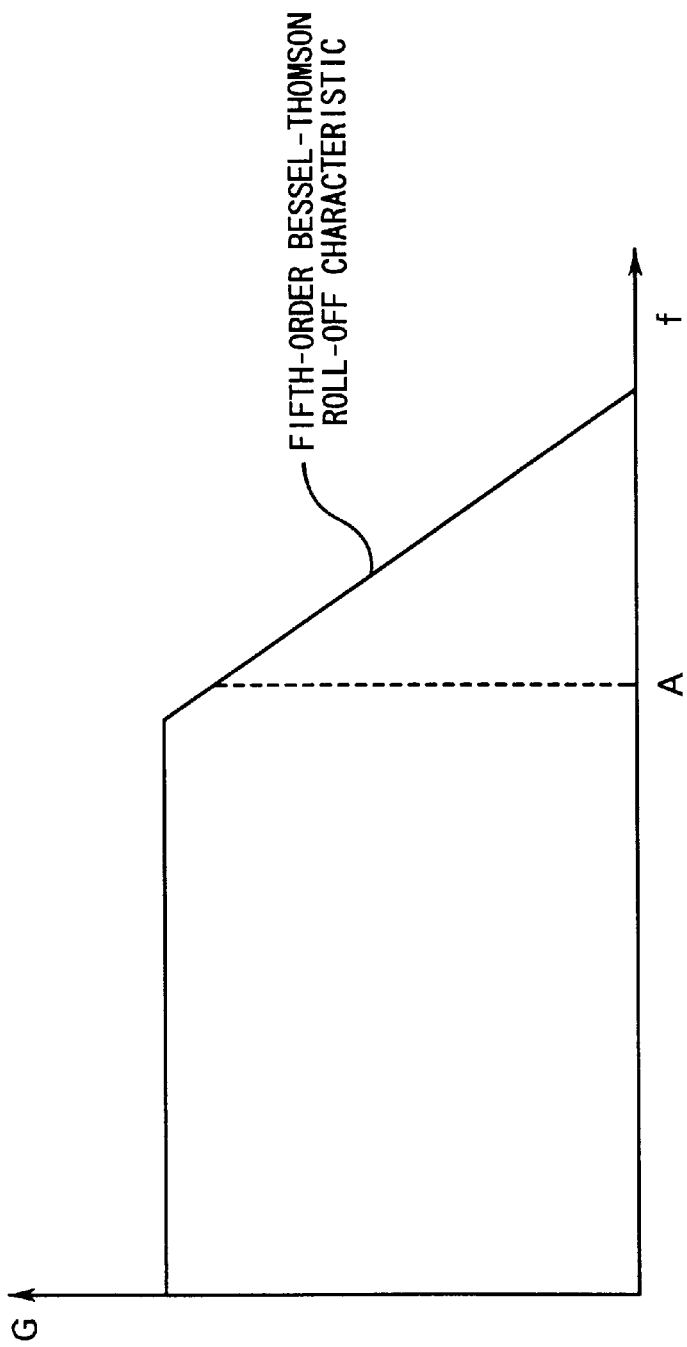
FIG. 3 is a diagram which shows a typical frequency response of a low-pass filter.

The following will now explain the frequency response of the low-pass filter 10 as part of the equalizing filter 1 (FIG. 1) according to the present invention. FIG. 3 shows a typical frequency response of the low-pass filter 10, where the vertical axis represents the filter's gain G and the horizontal axis shows the frequency f. This low-pass filter 10 is a fifth-order filter having a Bessel-Thomson roll-off characteristic.

Generally speaking, a narrower filter bandwidth gives a smaller eye aperture, while a wider bandwidth allows more noise to be introduced. There is a rule of thumb for optimal low-pass filter design; the −3 dB cutoff frequency should be set to 60 percent of the signal transmission rate. In the present example, the filter is designed to have a cutoff frequency of 6 GHz so as to show an optimal performance in 10 Gb/s data transmission.

Figure 4:
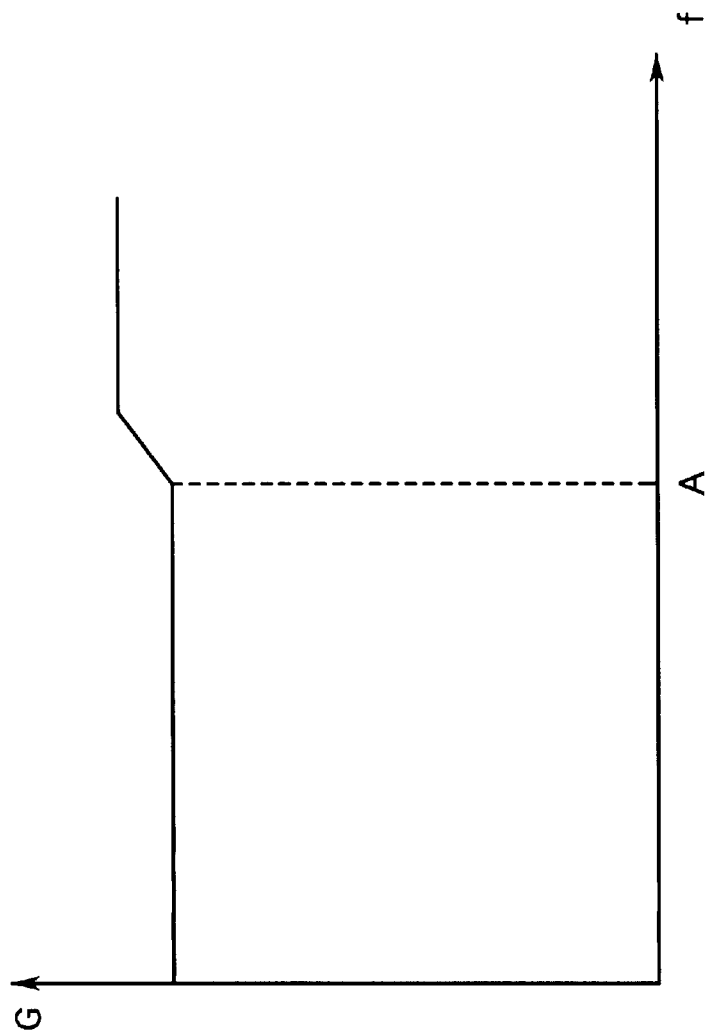
FIG. 4 is a diagram which shows a typical frequency response of a high-frequency booster circuit.

As mentioned earlier, the high-frequency booster circuit 20 is another integral part of the equalizing filter 1 of the present invention. FIG. 4 shows a typical frequency response of this high-frequency booster circuit 20, where the vertical and horizontal axes represent the circuit's gain G and the frequency f, respectively. FIG. 4 shows that the high-frequency booster circuit 20 enhances the high-frequency gain in a stepwise manner. Practically, such a frequency response is obtained by configuring an attenuation circuit to exhibit no attenuation in the high-frequency range beyond a given frequency A. Further details of the structure of this high-frequency booster circuit 20 will be provided later on.

Figure 5:
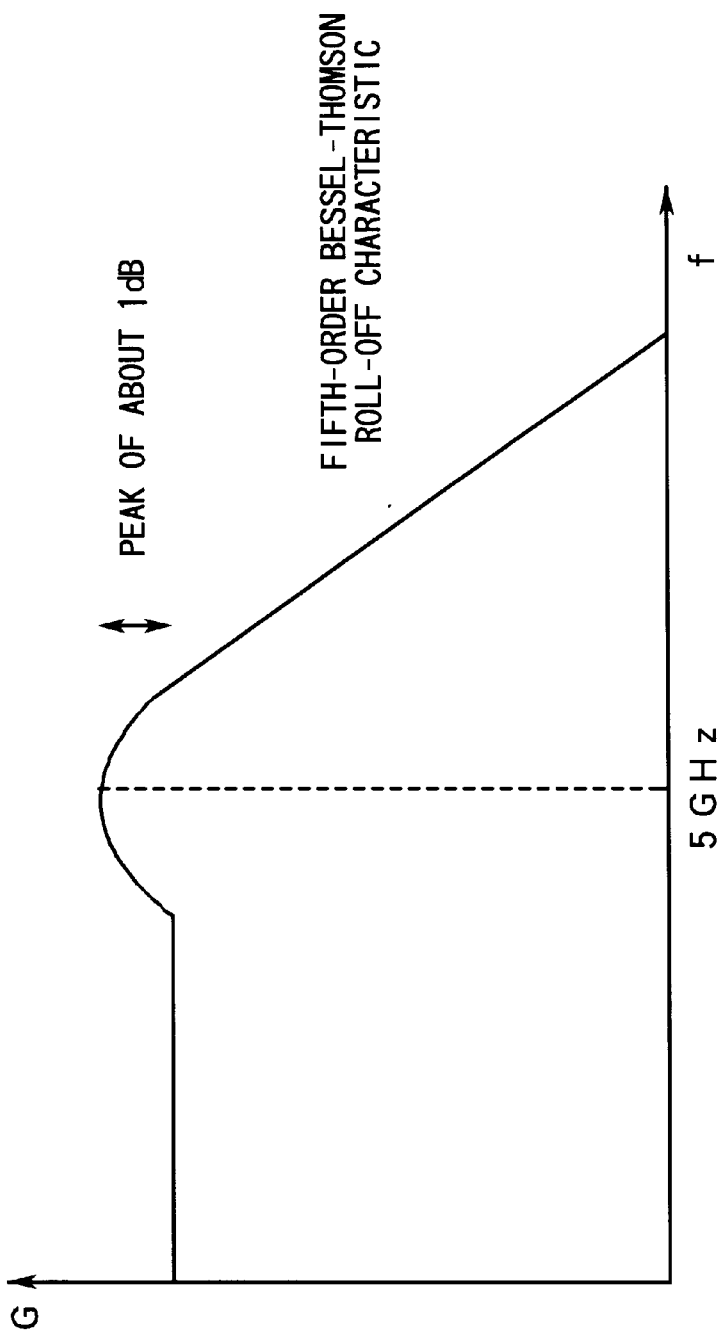
FIG. 5 is a diagram which shows a typical frequency response of an equalizing filter.

Referring next to FIG. 5, the following section describes the overall frequency response of the equalizing filter 1 of the present invention. The frequency response diagram of FIG. 5, where the vertical and horizontal axes represent the circuit's gain G and the frequency f, depicts the combined characteristics of the low-pass filter 10 (FIG. 3) and the high-frequency booster circuit 20 (FIG. 4), which constitute the equalizing filter 1. It exhibits a peak of about 1 dB at 50% of the data transmission rate (10 Gb/s), as well as showing a fifth-order Bessel-Thomson roll-off. With this frequency response, the equalizing filter 1 will demonstrate extremely excellent performance in signal equalization by displaying an "eye" that is nearly fully open.

The next few paragraphs will now present several types of implementations of the high-frequency booster circuit 20 in detail. The high-frequency booster circuit 20 of the present invention can be realized on the basis of pi attenuators or T attenuators, but with some additional passive components. Conventional pi and T attenuators have the capability of impedance matching, besides providing the desired signal attenuation. In the present case, the high-frequency booster circuit 20 is required to have an impedance of 50 ohms and a frequency response with a stepwise gain increase at a high frequency band as described earlier.

Figure 6:
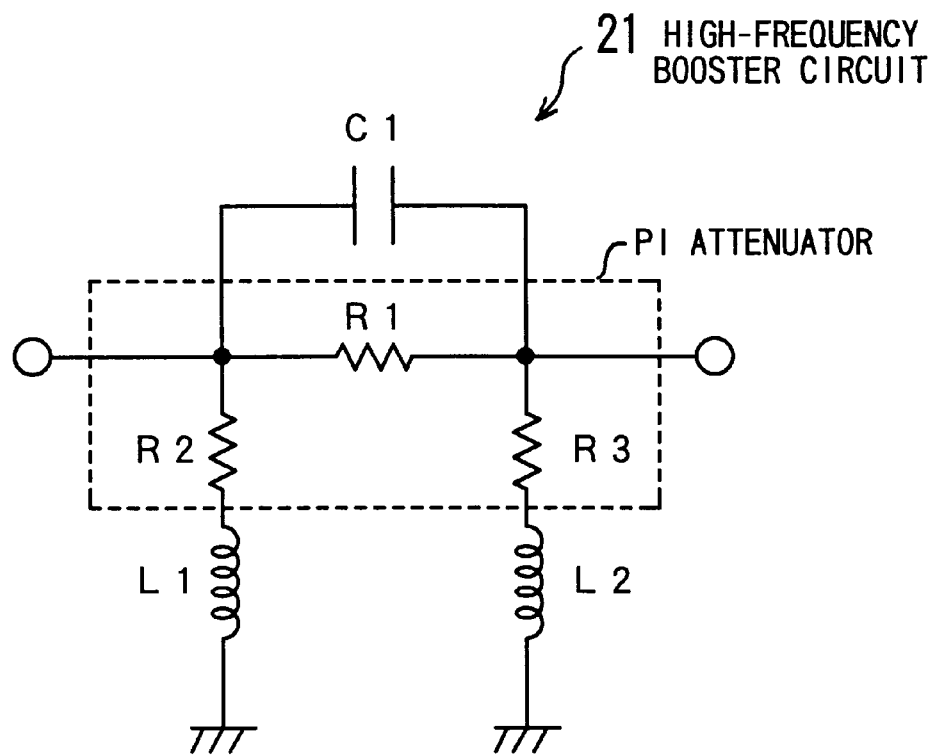
FIG. 6 is a diagram which shows the configuration of a high-frequency booster circuit designed on the basis of pi attenuator.
Figure 7:
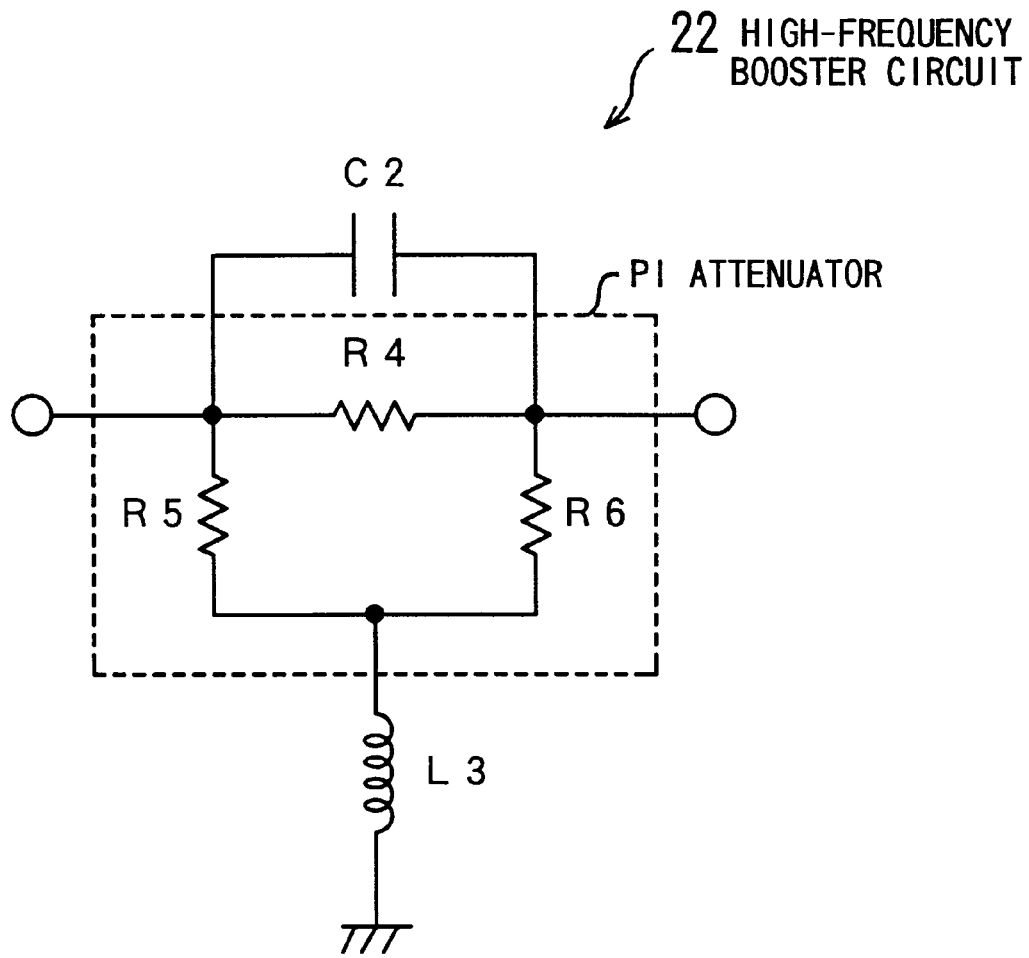
FIG. 7 is a diagram which shows the configuration of another high-frequency booster circuit designed on the basis of pi attenuator.

FIGS. 6 and 7 show the configuration of high-frequency booster circuits based on pi attenuator design. More specifically, FIG. 6 illustrates a high-frequency booster circuit 21, which comprises a series resistor R1 between the input and output terminals and two parallel resistors R2 and R3 connected to the ends of the resistor R1, thus forming a pi attenuator. The high-frequency booster circuit 21 also has a shunt capacitor C1 placed in parallel with the resistor R1, as well as employing two inductors L1 and L2 that are disposed in series with the resistors R2 and R3 at their ground (GND) sides, respectively.

Recall that capacitors exhibit low impedance and inductors makes the circuit open at high frequencies. To apply this knowledge to the pi attenuator of FIG. 6, the series resistor R1 is short-circuited and the parallel resistors R2 and R3 become open in a high-frequency range. By giving appropriate device parameters to those passive components, one can tune the attenuator so that it will exhibit no attenuation in an intended frequency band, thereby achieving, in other words, a stepwise gain increase at high frequencies.

Similarly to the above, FIG. 7 shows another high-frequency booster circuit 22, which comprises a series resistor R4 between the input and output terminals and two parallel resistors R5 and R6 connected to the ends of the resistor R4, thus forming a pi attenuator. It also has a shunt capacitor C2 placed in parallel with the resistor R4, as well as inserting an inductor L3 in series with the resistors R5 and R6 at their common ground side.

In this high-frequency booster circuit 22, the series resistor R4 is short-circuited and the parallel resistors R5 and R6 become open in a high-frequency range. That is, it is possible to set the attenuation level to zero in an intended frequency band. The circuit configuration of FIG. 7 has an advantage over the high-frequency booster circuit 21 of FIG. 6 in terms of space requirements, since it has eliminated one inductor.

Figure 8:
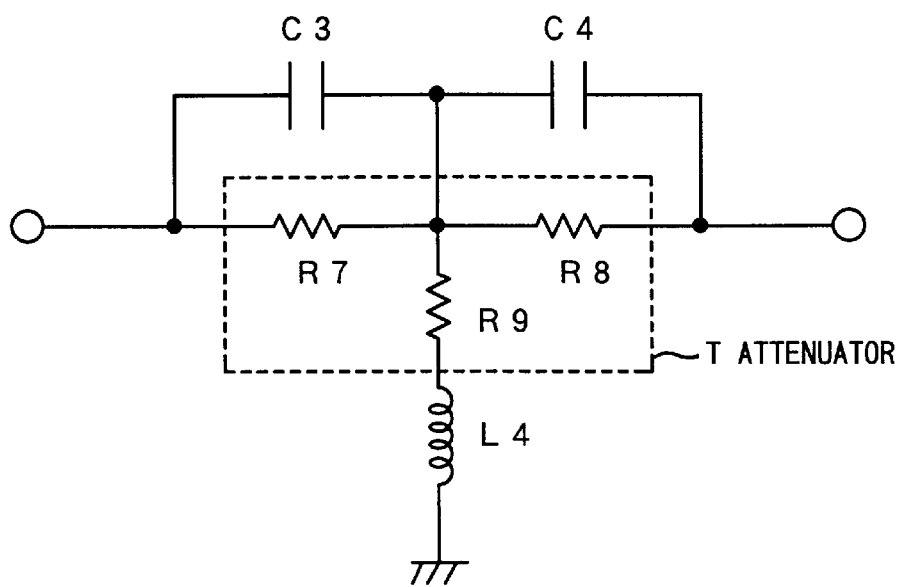
FIG. 8 is a diagram which shows the configuration of a high-frequency booster circuit designed on the basis of T attenuator.
Figure 9:
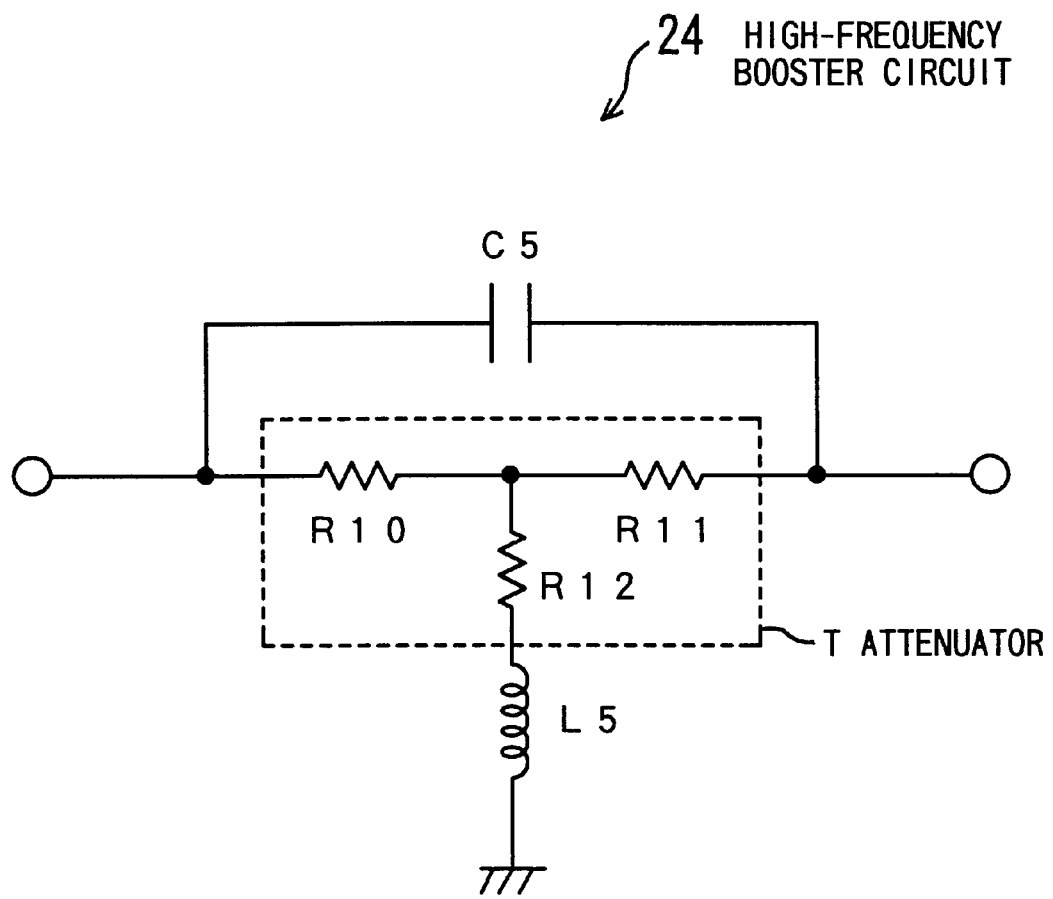
FIG. 9 is a diagram which shows the configuration of another high-frequency booster circuit designed on the basis of T attenuator.

FIGS. 8 and 9 show the configuration of high-frequency booster circuits based on the T attenuator design. First, FIG. 8 proposes a high-frequency booster circuit 23, which comprises two series resistors R7 and R8 between the input and output terminals and a parallel resistor R9 connected to the junction point of the two series resistors R7 and R8, thus forming a T attenuator. It also has shunt capacitors C3 and C4 placed in parallel with the resistors R7 and RS, respectively, as well as inserting an inductor L4 in series with the resistor R9 at its ground side. In this high-frequency booster circuit 23, the series resistors R7 and R8 are short-circuited and the parallel resistor R9 becomes open in a high-frequency range. That is, it is possible to set the attenuation level to zero in an intended frequency band, and thus the aforementioned stepwise gain increase can be obtained at high frequencies.

Second, FIG. 9 proposes another high-frequency booster circuit 24, which comprises two series resistors R10 and R11 between the input and output terminals and a resistor R12 connected to the junction point of the two series resistors R10 and R11, thus forming a T attenuator. It also employs a shunt capacitor C5 placed across the resistors R10 and R11, as well as employing an inductor L5 in series with the resistor R12 at its ground side.

In this high-frequency booster circuit 24, the series resistors R10 and R11 are short-circuited by the capacitor C5, and the parallel resistor R12 becomes open in a high-frequency range. This makes it possible to set the attenuation level to zero in an intended frequency band. The circuit configuration of FIG. 9 has an advantage over the high-frequency booster circuit 23 of FIG. 8 in terms of space requirements, since it has eliminated one capacitor.

Figure 10:
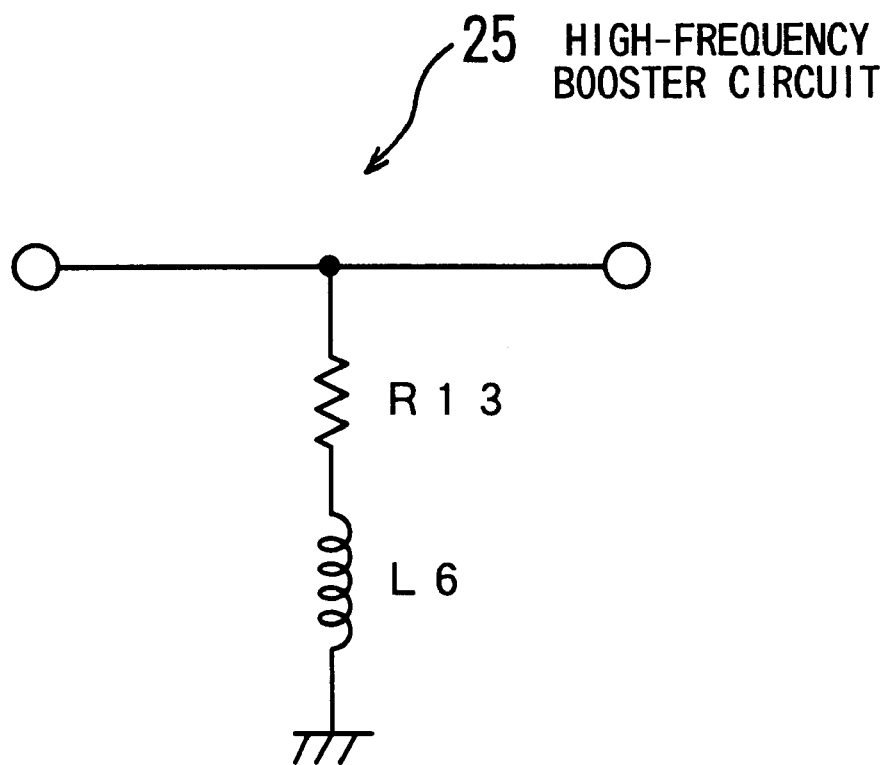
FIG. 10 is a diagram which shows the configuration of a high-frequency booster circuit whose design is not based on pi attenuator or T attenuator.
Figure 11:
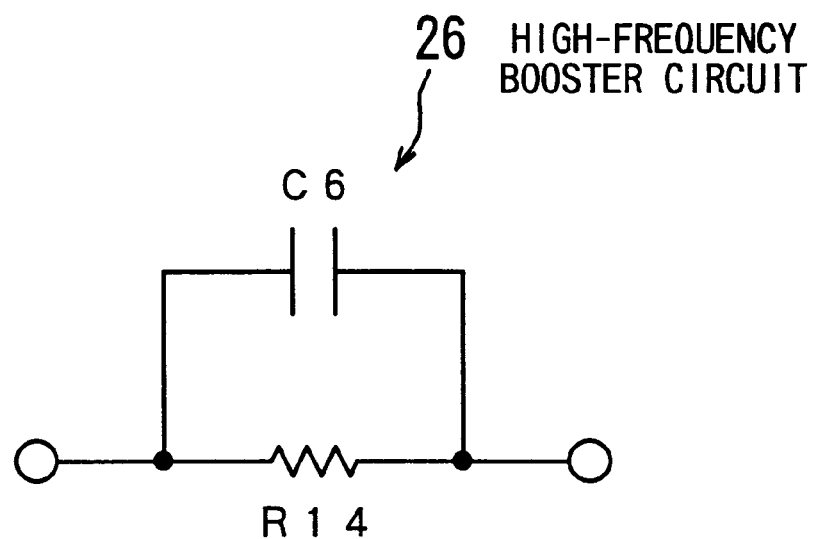
FIG. 11 is a diagram which shows the configuration of another high-frequency booster circuit whose design is not based on pi attenuators or T attenuators.

FIGS. 10 and 11 show the configuration of different types of high-frequency booster circuits whose design is not based on the conventional pi attenuators or T attenuators. FIG. 10 illustrates a high-frequency booster circuit 25, which comprises a parallel resistor R13 that is connected to the ground (GND) through an inductor L6. Due to the effect of the inductor L6, the resistor R13 becomes open at high frequencies. This makes it possible to set the attenuation level to zero in an intended high frequency band, and thus the aforementioned stepwise gain increase can be obtained at high frequencies.

In contrast to the above, FIG. 11 proposes another high-frequency booster circuit 26, where a series resistor R14 and a shunt capacitor C6 are connected in parallel. Due to the nature of the capacitor C6, the series resistor R14 will be short-circuited at high frequencies. That is, it is possible to set the attenuation level to zero in an intended high frequency band.

Unlike the aforementioned pi and T attenuators, the proposed high-frequency booster circuits 25 and 26 do not have such impedance characteristics that make matched loading possible. However, those simple high-frequency booster circuits 25 and 26 are suitable for the use at lower frequencies where impedance matching is not an essential issue.

Figure 12:
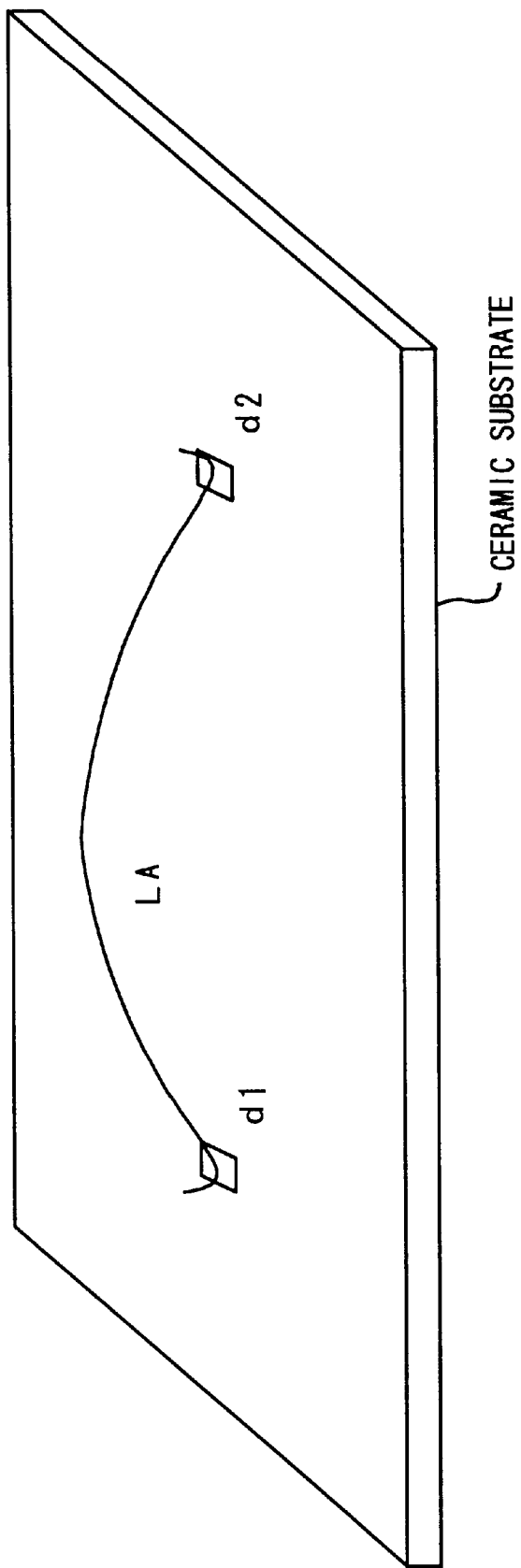
FIG. 12 is a diagram which shows an inductor made of a single bonding wire.
Figure 13:
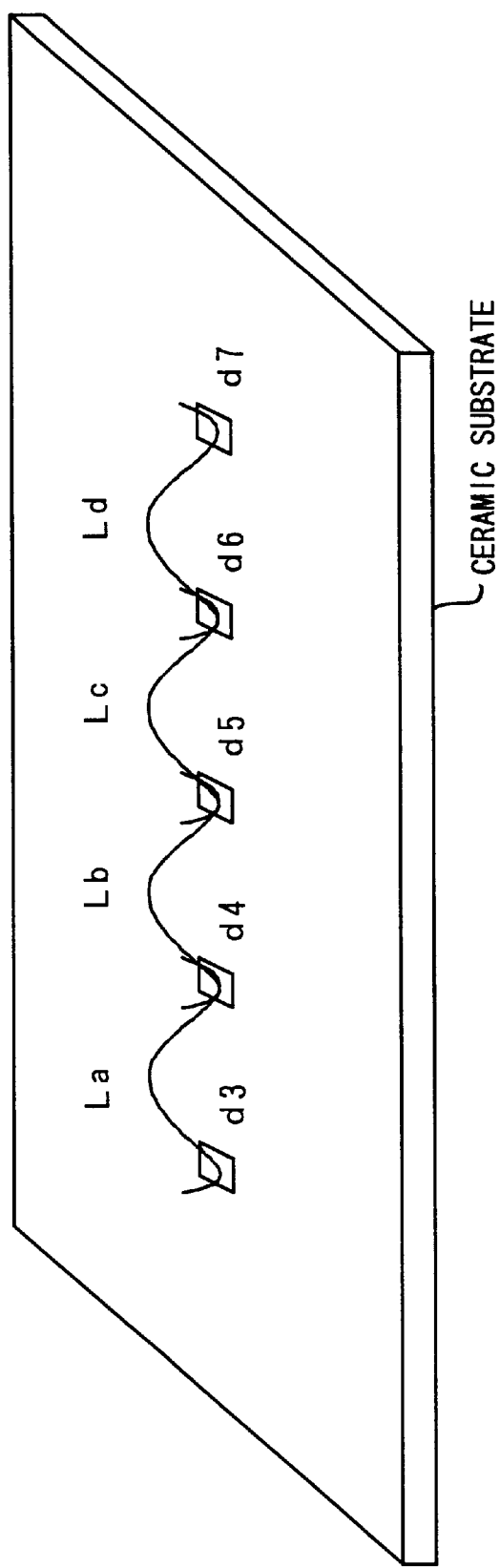
FIG. 13 is a diagram which shows the configuration of an inductor according to the present invention.

Referring now to FIGS. 12 and 13, the following section will describe a method of forming an inductor. According to the present invention, an inductor is formed on a substrate by executing the steps of: (a) dividing a bonding wire into a plurality of sections so that they will have a prescribed inductance in total, and then (b) making a daisy chain connection by bonding the bonding wire across a plurality of lands formed on the substrate.

FIG. 12 shows an inductor made of a single bonding wire. Two lands d1 and d2 are formed on a ceramic substrate and a single bonding wire is mounted between those lands, thus forming an inductor with an inductance value of LA. However, when a relatively large LA is required, a longer bonding wire should be mounted. Although it is still possible to simply place such a long wire on the ceramic substrate as shown in FIG. 12, this method is likely to introduce some errors in wire length due to the inaccuracy of manual bonding operations, which probably causes an error in the inductance to be obtained.

To solve the problem of the above method, the present invention proposes another method of forming an inductor as shown in FIG. 13. Here, small lands d3 to d7 are disposed on the ceramic substrate so that the desired inductance LA will be obtained as a sum of smaller inductances La, Lb, Lc, and Ld. The bonding wire, now being divided into smaller sections with the respective inductances La to Ld, is consecutively bonded on the lands d3 to d7, thus making a daisy chain connection. This proposed method permits the inductor to be precisely formed on the substrate, without depending on the accuracy of manual bonding operations.

Although the bonding wires potentially have good characteristics as an inductor for used in high frequency ranges, the first-mentioned method does not allow this advantage to be fully utilized in the circuit design. It has been particularly difficult to realize the inductors with large inductance by using bonding wires. The present invention, however, makes it possible to form a larger inductor by dividing the wire into smaller sections to reduce the deviations in wire lengths.

As described above, according to the inductor forming method of the present invention, a bonding wire is divided into a plurality of sections so that they will have a prescribed total inductance, and the desired inductor is formed by making a daisy chain connection to bridge across a plurality of lands formed on the substrate. Being free from wire length deviations, the present method can easily form inductors with large inductance.

Figure 14:
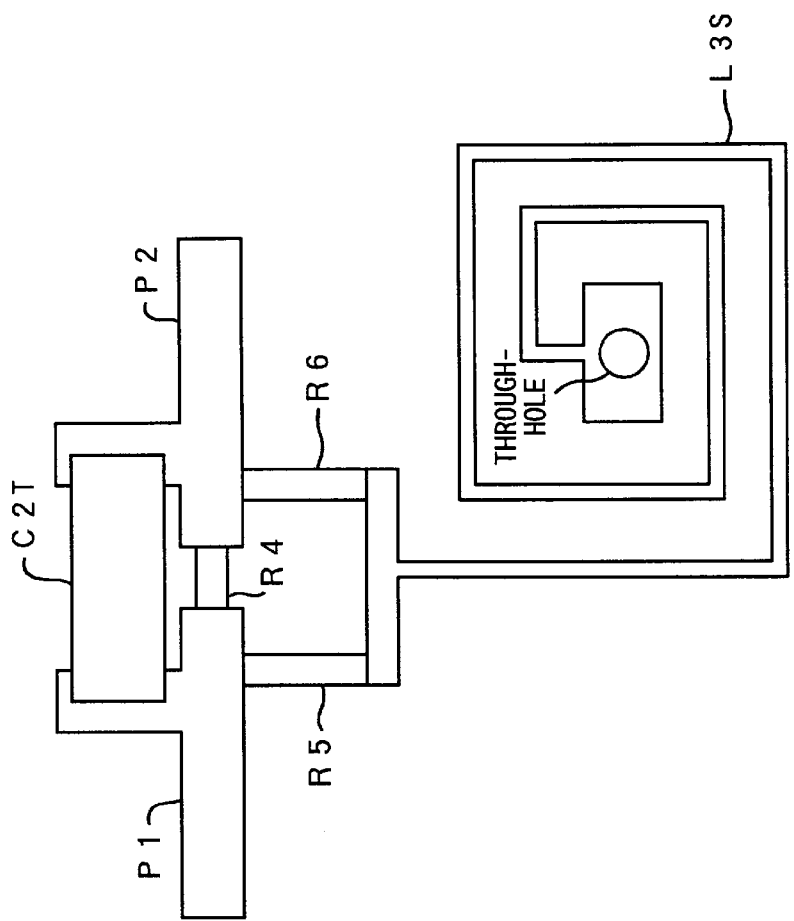
FIG. 14 is a diagram which shows a first implementation of the proposed high-frequency booster circuit.

Referring next to FIGS. 14 to 19, the following few paragraphs present two specific implementations of the high-frequency booster circuit 20. FIG. 14 shows a first implementation, whose design concept is based on the pi-shaped high-frequency booster circuit 22 illustrated in FIG. 7. Note that this circuit employs a spiral inductor formed on a ceramic substrate.

FIG. 14 shows the top view of the high-frequency booster circuit, where input and output patterns, P1 and P2, are microstrip lines with a characteristic impedance of 50 ohms. A capacitor C2T and a resistor R4, mounted in parallel, bridge those input and output patterns. In addition, two resistors R5 and R6 are connected to the input and output patterns P1 and P2, respectively, while their ground side terminals are commonly connected to a spiral inductor L3S. The other end of the spiral inductor L3S is connected to a ground plane (not shown) on the back of the substrate via a through-hole. Here, all the resistors R4, R5, and R6 are thin-film resistors; the capacitor C2T is a chip capacitor of 1 to 2 mm square, with metallized terminals for soldering.

Figure 15:
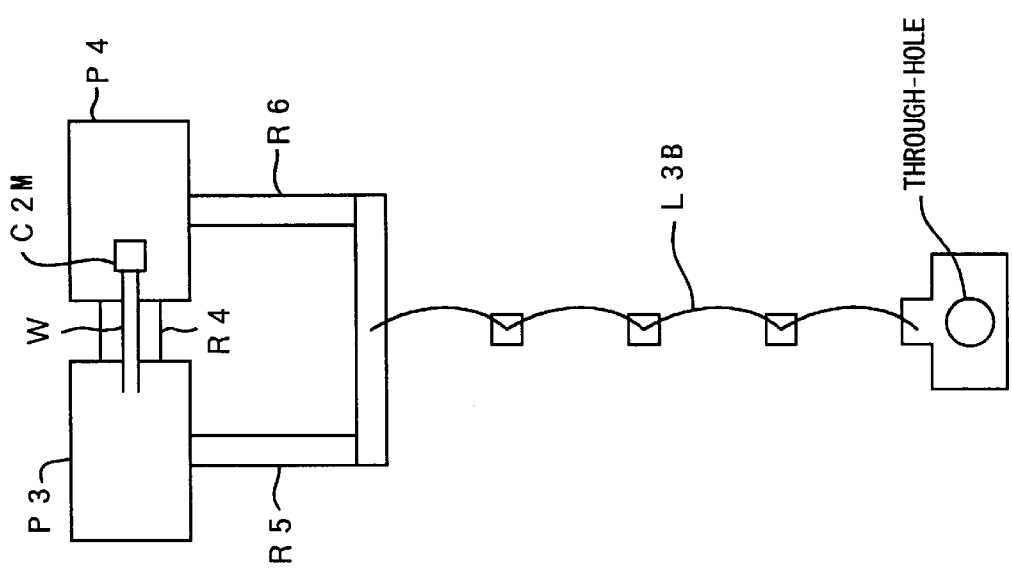
FIG. 15 is a diagram which shows a second implementation of the proposed high-frequency booster circuit.

FIG. 15 shows a second implementation of the high-frequency booster circuit 20. As in the first implementation, this second implementation is also based on the pi-shaped high-frequency booster circuit 22 illustrated in FIG. 7, but it employs a bonding wire inductor produced according to the present invention, instead of using a spiral inductor.

FIG. 15 illustrates the top view of this high-frequency booster circuit, where input and output patterns P3 and P4 are microstrip lines with a characteristic impedance of 50 ohms. A capacitor C2M and a resistor R4 are mounted in parallel to connect the input pattern P3 and the output pattern P4. The capacitor C2M is a chip capacitor of 0.3 to 0.5 mm square, whose one end is bonded on the output pattern P4 by using a conductive adhesive while the other end is connected to the input pattern P3 with two wires W.

Further, a resistor R4 bridges the input and output patterns P3 and P4, and two resistors R5 and R6 are connected to the input and output patterns P3 and P4, respectively. The ground side terminals of the resistors R5 and R6 are commonly connected to an inductor L3B. The other end of the inductor L3B is connected to a ground plane (not shown) on the back of the substrate via a through-hole.

Figure 16:
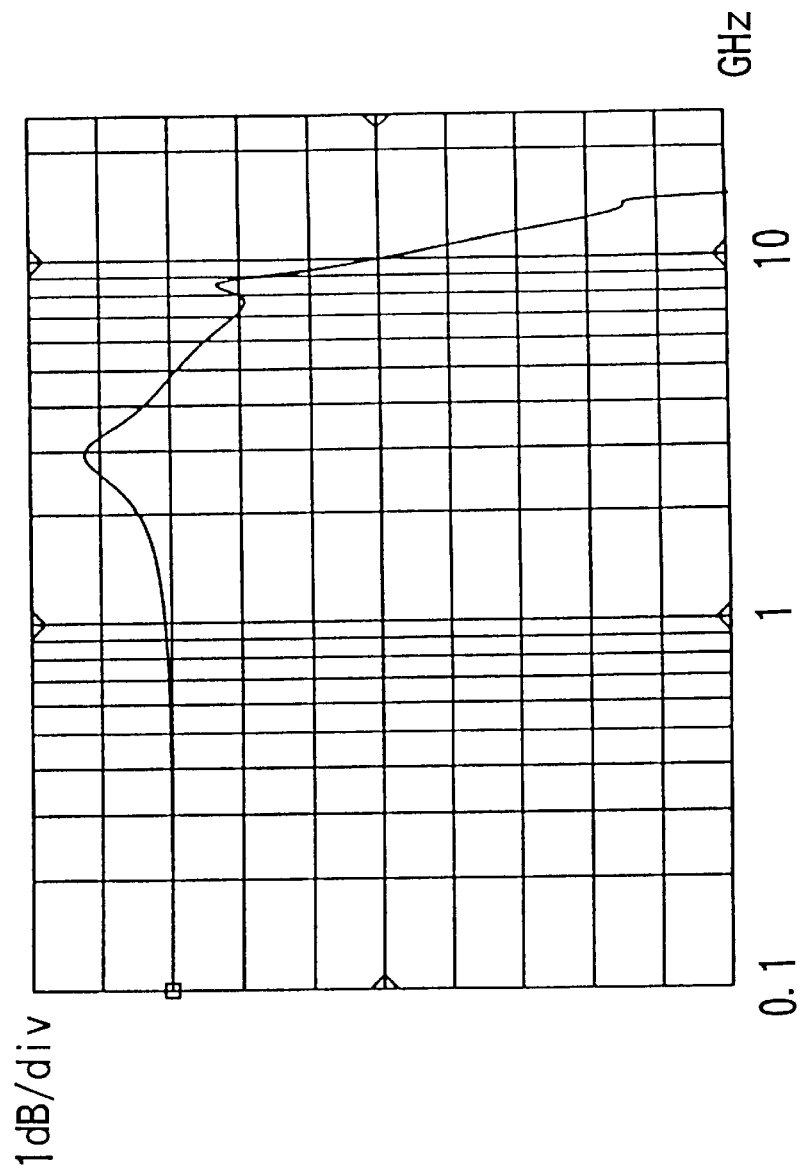
FIG. 16 is a Bode diagram which is obtained by a simulation of the first implementation combined with a low-pass filter circuit.

According to the computer simulation, the above-described two specific high-frequency booster circuits exhibit the following performance. FIG. 16 is a Bode diagram which shows the simulation results for the first implementation combined with a low-pass filter circuit, where the vertical axis represents the gain (1 dB/div) and the horizontal axis shows the frequency (GHz). The first implementation, which employs a spiral inductor printed on the ceramic substrate, exhibits a few ripples in a higher frequency range, from the transition band to attenuation band.

Figure 17:
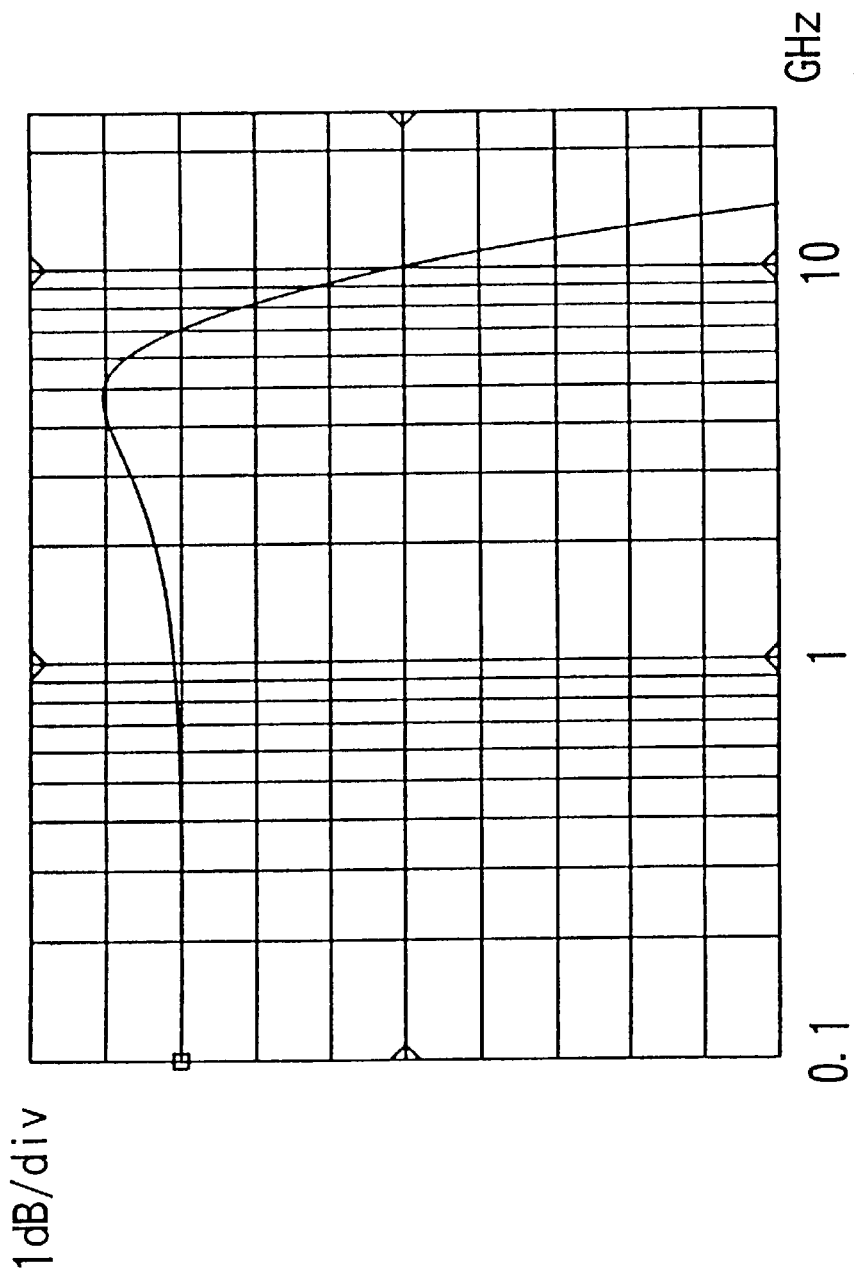
FIG. 17 is a Bode diagram which is obtained by a simulation of the second implementation combined with a low-pass filter circuit.

FIG. 17 is a Bode diagram which shows the simulation results for the second implementation combined with a low-pass filter circuit, where the vertical axis represents the gain (1 dB/div) and the horizontal axis shows the frequency (GHz). Unlike the first implementation, the second implementation, which employs a bonding-wire inductor proposed in the present invention, exhibits no ripples in any frequency ranges including the transition band and attenuation band.

Figure 18:
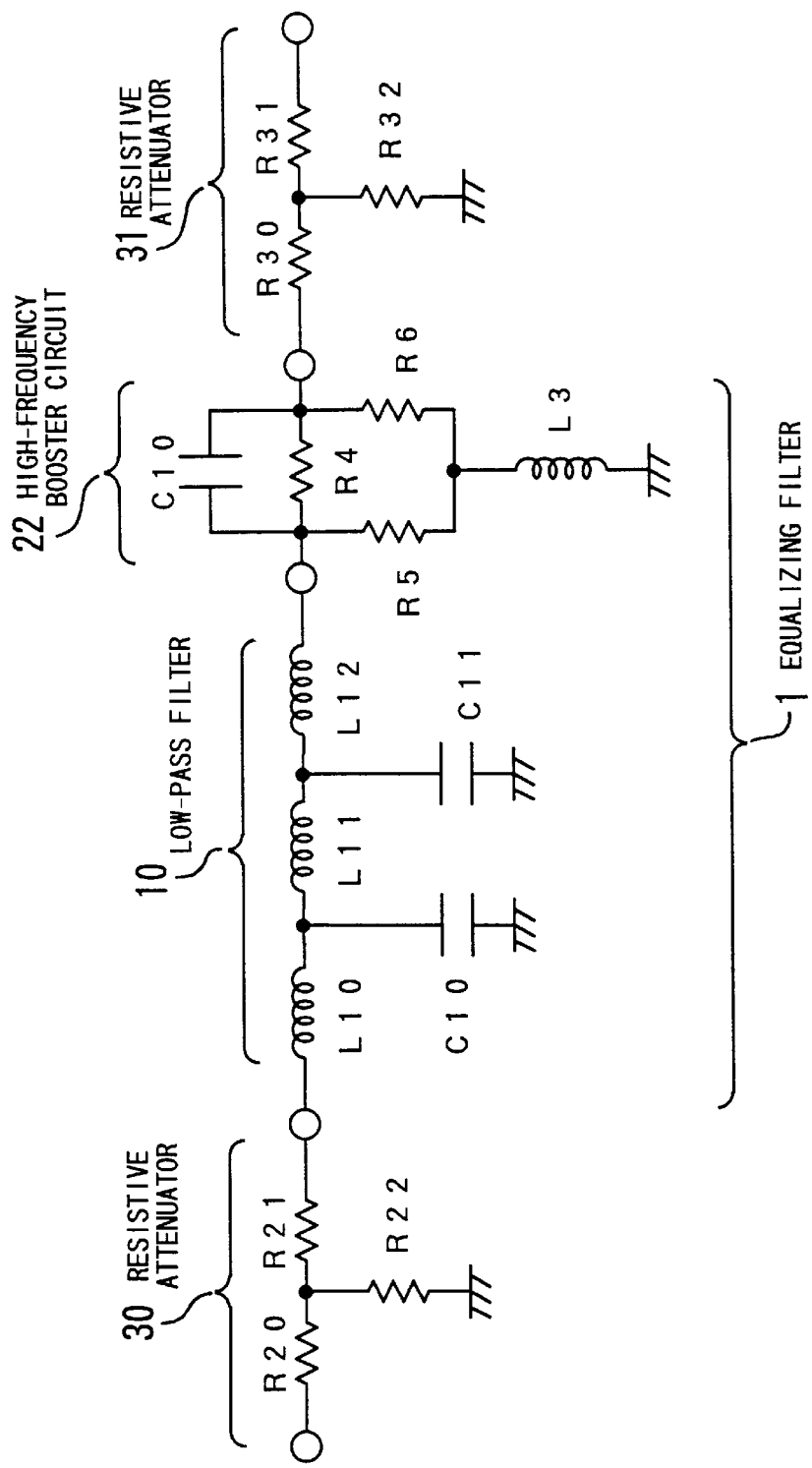
FIG. 18 is a diagram which illustrates the total structure of an equalizing filter of the present invention.

Referring next to FIG. 18, the following section will be devoted to the total configuration of the equalizing filter 1 according to the present invention. Generally speaking, filters cause a mismatch of impedance in frequency ranges out of their passbands, and therefore, additional resistive attenuators are inserted in some cases to compensate for this impedance mismatch. In the present example of FIG. 18, two resistive attenuators 30 and 31 are disposed at the input and output ends of the equalizing filter 1. To yield an enhanced high-frequency gain, the equalizing filter 1 employs a high-frequency booster circuit 22 based on a pi filter design, which requires fewer components as discussed in FIG. 7 and minimizes the distance between the shunt capacitor and other circuit components in comparison with other designs. For the detailed configuration and operation of the low-pass filter 10 and high-frequency booster circuit 22, see the earlier part of this description.

The passive components used in the equalizing filter 1 of FIG. 18 are listed in FIGS. 19(A) to 19(C), along with their parameters. More specifically, FIG. 19(A) shows the values of passive components used in the resistive attenuators 30 and 31. FIG. 19(B) shows the values in the low-pass filter 10, while FIG. 19(C) shows the same in the high-frequency booster circuit 22.

As described above, the equalizing filter 1 of the present invention comprises a low-pass filter 10 and a high-frequency booster circuit 20 with a stepwise gain increase at high frequencies, both of which are composed of passive components. This structural arrangement permits the equalizing filter 1 to have an optimal frequency response, which contributes to the development of optical receivers with high sensitivities. Being composed of passive components, the equalizing filter 1 is little affected by the deviations in its production process, temperature changes, or fluctuation in supply voltages. This advantageous nature results in high reliability and quality of the optical receiver products.

Figure 20:
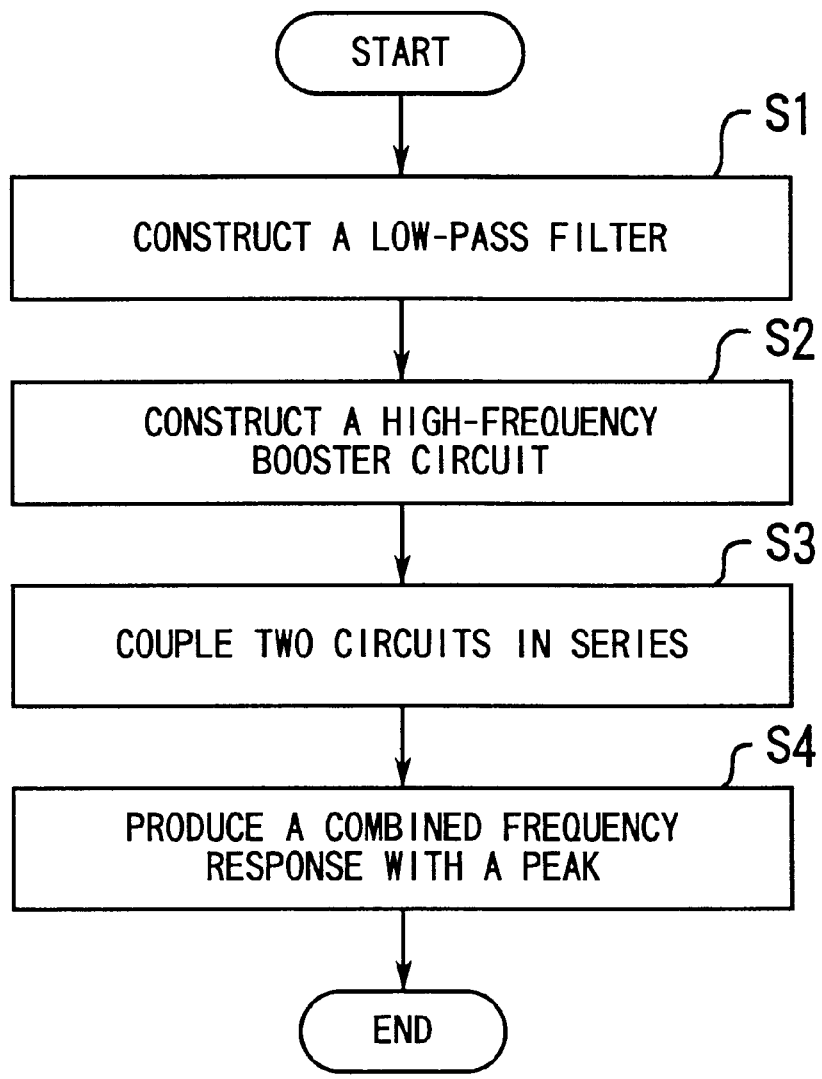
FIG. 20 is a flowchart which shows a control process for signal equalization of the present invention.
Figure 21:
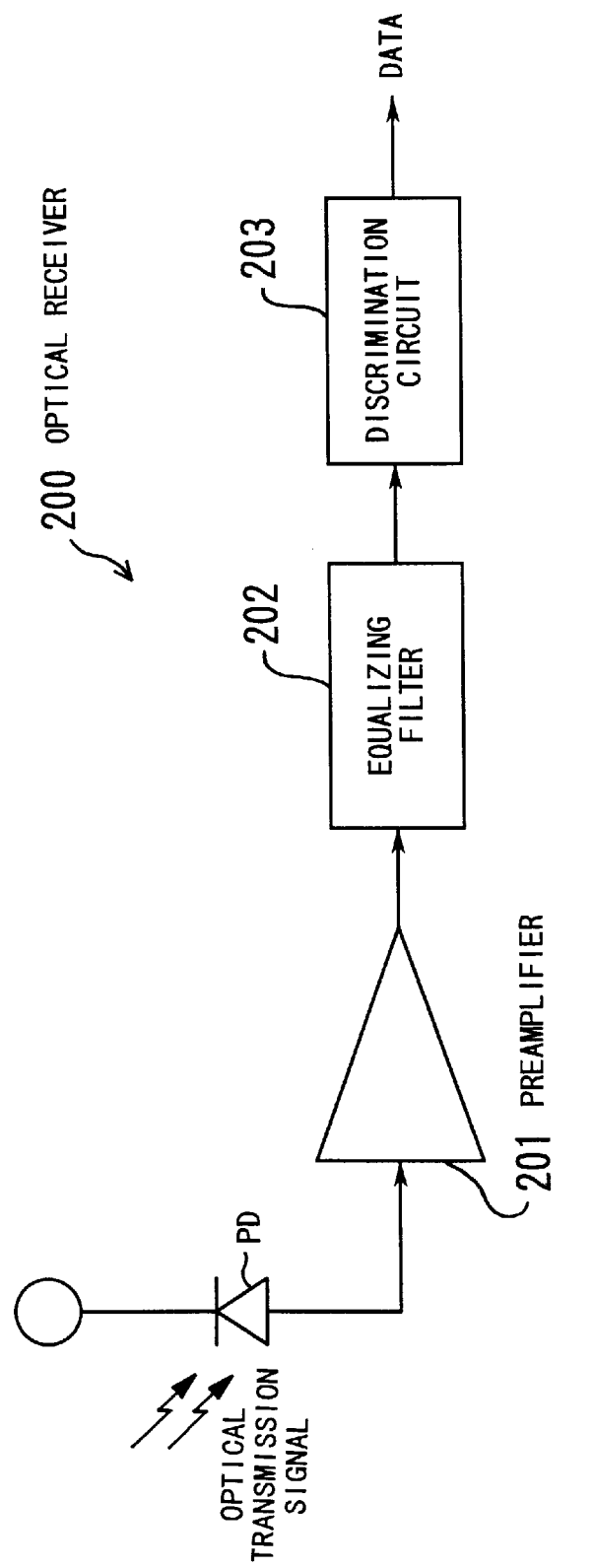
FIG. 21 is a block diagram which shows a typical configuration of a conventional optical receiver.

The next section will now describe a control method for signal equalization proposed in the present invention, whose procedure is given in a flowchart of FIG. 20. According to the present invention, the process comprises the following four steps.

(S1) Constructing a low-pass filter to have fifth-order Bessel-Thomson filter characteristics.

(S2) Constructing a high-frequency booster circuit by adding several passive components to a pi or T attenuator so that the circuit will exhibit a stepwise gain increase in a high frequency range.

(S3) Coupling the low-pass filter and high-frequency booster circuit in series.

(S4) Producing a combined frequency response that exhibits a peak at a predetermined frequency which is, for example, equal to a half of the bit rate used.

As described above, the control method of the present invention makes a series connection of a low-pass filter and a high-frequency booster circuit having a stepwise gain increase in a high frequency range, so that the combined frequency response will exhibit a peak at a predetermined frequency. This control method provides a frequency response that exhibits a wider aperture in eye pattern tests.

In summary of the above discussion, according to the present invention, the equalizing filter comprises a low-pass filter and a high-frequency booster circuit with a stepwise gain increase at high frequencies, both of which are composed of passive components. This structural arrangement permits the equalizing filter to have an optimal frequency response, which contributes to the development of optical receivers with high sensitivities. Further, because it is composed solely of passive components, the equalizing filter is little affected by the deviations in its production process, temperature changes, or fluctuation in supply voltages, resulting in high reliability and quality.

Moreover, the present invention proposes a control method for signal equalization. This method makes a series connection of a low-pass filter and a high-frequency booster circuit having a stepwise gain increase in a high frequency range, so that the combined frequency response will exhibit a peak at a predetermined frequency. Accordingly, the equalized signal exhibits a wider aperture in eye pattern evaluation tests.

Furthermore, the present invention proposes a new method for forming an inductor. According to this proposed method, a bonding wire is divided into a plurality of sections so that they will connect between a plurality of lands disposed on the substrate, thereby forming a daisy chain connection. Being free from wire length deviations, the present method can easily form an inductor with large inductance.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An equalizing filter for equalizing a signal to obtain a desired waveform thereof, comprising:

a low-pass filter composed of passive components; and a high-frequency booster circuit, coupled to said low-pass filter and composed of passive components, whose frequency response exhibits a stepwise gain increase at high frequencies.

2. The equalizing filter according to claim 1, wherein said low-pass filter and said high-frequency booster circuit are connected in series.

3. The equalizing filter according to claim 2, further comprising a resistive attenuator disposed at an input of said low-pass filter.

4. The equalizing filter according to claim 2, further comprising a resistive attenuator disposed at an output of said high-frequency booster circuit.

5. The equalizing filter according to claim 1, wherein said high-frequency booster circuit is constructed as a combination of a pi attenuator and additional passive components.

6. The equalizing filter according to claim 1, wherein said high-frequency booster circuit is constructed as a combination of a T attenuator and additional passive components.

7. The equalizing filter according to claim 1, wherein said high-frequency booster circuit comprises an inductor that is made of a bonding wire.

8. The equalizing filter according to claim 7, wherein said bonding wire is divided into a plurality of sections so that the sections will exhibit a predetermined inductance in total.

9. A control method for signal equalization to obtain a frequency response that exhibits a wider aperture in an eye pattern test, comprising the steps of:

making a series connection of a low-pass filter and a high-frequency booster circuit having a stepwise gain increase at high frequencies; and producing a combined frequency response having a peak at a predetermined frequency.

* * * * *